Patented June 16, 1936

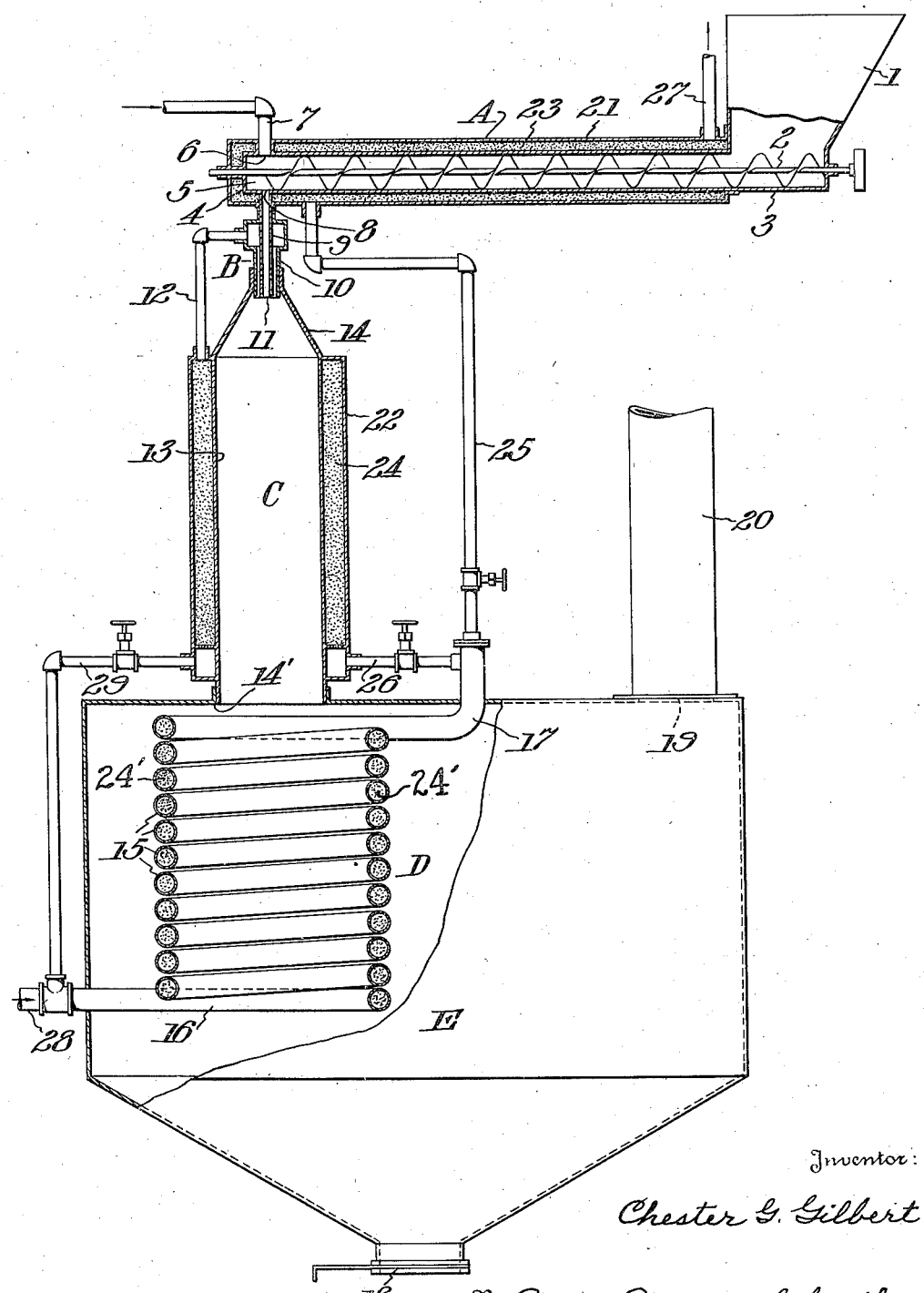

2,044,680

UNITED STATES PATENT OFFICE

2,044,680

SPHERULIZING FUSIBLE PULVERIZABLE FILLER MATERIAL

Chester G. Gilbert, Washington, D. C., assignor to Research Corporation, New York, N. Y., a corporation of New York Application February 12, 1934, Serial No. 710,974

15 Claims. (Cl. 49—57)

This invention relates to the provision of fusible pulverizable materials—particularly silicious filler materials—in spherular form, and resides in an improved process of spherulization and in an apparatus peculiarly adapted thereto.

It heretofore had been proposed (see U. S. Patent No. 1,175,224 to Bleecker) to reduce glass, or similarly fusible material, to granules by a process consisting essentially in subjecting pulverized glass to the influence of heat while in motion by dropping the pulverized glass, in a stream, into the path of a more or less horizontal jet of burning gas, whereby to exert upon the pulverized glass a disseminative effect and simultaneously a fusing action, maintaining the particles in flight during fusion and subsequent solidification. It was found, however, that the practically uncontrollable disseminative action of the flame was insufficient positively to disperse the individual particles of powdered glass, and that the resulting product contained substantial amounts (e. g., one-fifth, more or less) of irregularly shaped (non-spherulized) particles and of aggregated particles superficially fused together in what may be called "clover-leaf" form. In cases where regularity of shape and uniformity of size of the resulting particles was of major or even material consideration, such incompletely spherulized products were objectionable if not unusable; the task of separating the irregularly shaped (non-spherular) from the regularly shaped (spherular) particles, while theoretically possible, was and is not commercially feasible. Moreover, while it was possible to reduce the relative amount of non-spherular particles in the once-processed product by re-passing the latter one or more times through the flame, it was not possible altogether to dispose of non-spherular particles by this means, and repeated passages of the material through the flame ran the danger of increasing the content of "clover leaves." It was realized, therefore, that anything less than complete spherulization of all the material treated was valueless, because the presence of any angular (i. e., non-spherular) shapes at all in the final product is likely completely to nullify the value of the result. Thus, in a polishing powder, the scratching effect of one angular particle of filler offsets the advantages gained from a great number of spherular filler particles.

Another fundamental disadvantage of the hereinbefore described process is its extremely low thermal efficiency. The heat generated by combustion is absorbed by the particles at a rate which for practical purposes may be said to vary inversely with the square of the diameter of the particles. As the particle size diminishes the rate of heat absorption increases tremendously, until a point is reached where the rate of absorption is greater than the rate of combustion, at which point combustion is extinguished. This phenomenon is recognized by the Bureau of Mines as affording the basis for their scheme of using rock dust as a preventive for mine explosions. It is evident, too, that along with the increasing absorption rate with decreasing particle size, the rate of absorption increases directly with the increase in the total amount of solids present. With reference to these two factors affecting the rate of heat adsorption and consequent tendency to extinguish combustion, and referring to the prior art procedure, it was appreciated that in introducing a stream of finely divided particles into the flame one tends to extinguish combustion in the immediate vicinity of the point of introduction, with the result that spherulization can not take place unless and until the stream of particles has been swept along and sufficiently dispersed to diminish the rate of absorption to a point below the rate of combustion and admit of re-ignition of the gases enveloping the particles, thus making possible spherulization. In such circumstances it is unavoidable that an appreciable portion of the particles never becomes subjected to spherulizing temperature before passing out of the zone of influence of the flame. But even if the particles dropped into the flame do not absorb heat therefrom at such a rate and in such an amount as to extinguish combustion, the rate and amount of heat absorption may well be sufficient to prevent a temperature rise sufficient actually to fuse and spherulize the suspended particles, with the result that complete spherulization will not take place although the combustion is complete. Hence I found that in carrying out the prior art procedure the theoretical limit of concentration (of solids) for spherulization—assuming complete combustion in a theoretic air-city gas mixture, without radiation or other losses, would be around a quarter of a pound of pulverized glass per cubic foot of gas consumed. Actual tests of that process determined that to attain an 80% spherulization the rate of feed of the pulverized glass had to be held at less than two ounces per cubic foot of gas: to attain 98% spherulization (by repetition of the procedure) it required consumption of about 25 cubic feet of gas per pound of final product.

An object of the present invention is the provision of a process of spherulization in which the individual particles of the pulverized material to be spherulized are controllably dispersed (not merely subjected to uncontrolled disseminative influence) and are maintained in such dispersed condition during their passage through a heating zone of fusing temperature and thereafter through a zone of cooling (solidification). Another object of the invention is the provision of a process yielding directly a spherulized product consisting of spherular particles of substantially uniform size and form. A further object is the provision of an economical and commercially practical process for complete spherulization of finely divided fusible pulverizable substances: also the provision of an apparatus adapted for the economical and complete spherulization of said substances.

The above, and other, objects are afforded by the improved process of the present invention, which process is characterized broadly by the step of dispersing pulverized fusible material in a dispersing vehicle prior to the introduction of said material into a heating zone of fusing temperature and moving the vehicle and the material dispersed therein into and through such a heating zone and through a zone of solidifying temperature, the material being suspended or "in flight" throughout said movement. By the expedient of insuring positive dispersion of the individual particles of material before they are subjected to a fusing heat I am able to prevent irregular fusion and aggregation, and to insure more nearly uniform and complete spherulization.

I have found, further, that an improved result is afforded by preheating the material to be spherulized prior to introduction of the same into the fusing zone and bringing the material into the latter zone in such preheated condition. Thereby a double advantage is gained: the material lends itself the more readily to dispersion at elevated temperatures, and an improved economy in fuel is effected. Preferably, I bring the material into the fusing zone at a temperature as close as practicable to, but not at, the temperature of incipient fusion of the particular material undergoing spherulization.

Moreover, I have found that it is desirable to maintain the whole dispersion at a temperature above, or at least at, the spherulizing point of the particular material: also to confine the dispersion during combustion within a chamber whose walls are maintained at a temperature above, or at least at, the ignition point of the fuel being consumed, and either below the fusing point of the suspended particles or very substantially above said fusing point. By these expedients adhesion of fused particles to the walls of the chamber is avoided, and danger of extinguishment of combustion is positively avoided.

Further to improve the economy of the process, I have found it advisable to preheat also the combustion air (i. e., the air to be admixed with the fuel for eventual complete combustion of the latter) to a temperature at least equal to the ignition temperature of the particular fuel used, and to admix the air with the fuel while so preheated. By preheating the combustion air and the solid material to be spherulized, it is possible very materially to increase the concentration of dispersed finely divided solid material with respect to combustion air and fuel without danger of extinguishing combustion. While it is necessary to maintain the concentration of solids below that limit at which the heat absorbed decreases the combustion temperature below the spherulizing point, it will be appreciated that by working with a dispersion whose temperature, prior to combustion, is fairly close to the spherulizing temperature of the solids and in all events is above the ignition temperature of the fuel, the amount of necessary heat to be provided by the combustion is only that represented by the difference between the initial temperature of the dispersion at the moment of initiating combustion and the spherulizing temperature of the solid material undergoing treatment, and that where this difference is made as small as practicable only a very small addition of heat is necessary in order to effect spherulization of the dispersed solids.

The employment of the above-discussed expedients has made possible the complete spherulization, in one "pass", of, for example, finely divided volcanic ash, using as fuel a city gas of about 500 B. t. u. value, with the consumption of as little as 1 cubic foot of that fuel per 1 pound of spherulized volcanic ash product.

The invention will be described in greater detail with reference to the following data determined by repeated experiment for a number of fusible pulverizable solids.

*Fuel*

City gas of about 500 B. t. u. value, the combustion temperature of a theoretic mixture thereof with air being ±1200° C.

*Preheating temperature of solids*

|  | Centigrade |
|---|---|
| Common scrap glass | 500°–600° |
| Volcanic ash | ±800° |
| Diatomaceous earth | ±1200° |

*Preheating combustion air*

|  | Centigrade |
|---|---|
| Common scrap glass | 500°–600° |
| Volcanic ash | ±800° |
| Diatomaceous earth | ±1200° |

*Temperature maintained in the surfaces confining the combustion zone*

|  | Centigrade |
|---|---|
| Common scrap glass | 500°–600° |
| Volcanic ash | 500°–800° |
| Diatomaceous earth | 500°–1200° |

*Combustion temperature maintained in combustion zone*

|  | Centigrade |
|---|---|
| For common scrap glass | ±800° |
| For volcanic ash | 1050°–1100° |
| For diatomaceous earth | 1400°–1500° |

While it is possible to preheat the fuel, the amount of the latter used with respect to the amount of solids and the amount of combustion air is so small that the preheating of the fuel increases the total efficiency only insignificantly.

For preheating the combustion air and the solids to be spherulized for cooling the freshly prepared spherulized solids, and for maintaining the surfaces confining the combustion zone at a suitable temperature I prefer to effect a heat exchange therebetween. Thus, I may cool the freshly prepared spherulized solids by means of room temperature air and use the resulting highly heated air as the heating agent for preheating the solids to be spherulized and for initially raising the temperature of the surfaces confining the combustion zone to the desired level: also, I may use this highly heated air as part or all of the combustion air. After the said confining surfaces have been heated sufficiently high, I prefer to maintain them at the desired temperature (e. g., sufficiently cool them) by means of room temperature air, the resulting highly heated air being used, if desired, as part or all of the combustion air and/or as heating medium for the preheating of the solids to be spherulized.

The above-described process may be effected in one or another of a variety of specific apparatus.

In the following I shall describe a specific apparatus adapted to be used for the carrying out of the present invention, said description being considered with reference to the accompanying drawing in which the single figure is a schematic representation of the assembly constituting the preferred embodiment of the apparatus aspect of the present invention.

In the drawing:

The reference character A refers to a feeding and dispersing means, B is a burner, C is a combustion chamber, D is a heat-exchange zone and E is a subsidence zone.

In A; I represents a suitable feed hopper for the finely subdivided solid to be spherulized, out of the bottom of which hopper extends the feed worm 2 surrounded by the feeding tube 3 whose end remote from hopper I is closed by cap 4. The worm 2 does not extend to the tube cap 4, but leaves a space 5 in the end of the tube 3 remote from the hopper I, into which space a dispersing gas may be led through opening 6 from conduit 7. Opposite opening 6 in tube 3 is another opening 8, giving communication between device A and burner B. In the latter 9 represents the inner tube, and 10 the outer tube, of the burner. 11 is the orifice of the burner. Outer tube 10 communicates with conduit 12.

Combustion chamber C comprises a relatively elongated cylinder 13 whose upper end is closed by a conical closure 14, into the upper end of which latter extends the orifice end of burner B. The lower end of cylinder 13 is open, and registers with an opening 14' in the top of settling chamber E. Directly beneath opening 14' there is located in the upper part of chamber E a heat exchange device D composed of a coiled conduit 15 the diameter of whose coil is somewhat larger than that of the opening 14'. In the drawing I have shown this coil to be filled for the major part of its length with a suitable heat-exchange packing, e. g., coarse sand, as indicated at 24', 24'. This packing may, with considerable loss of heat-exchange efficiency, be omitted. Small quartz gravel or other suitable heat-exchange packing may be substituted for the coarse sand. Devices C and D are substantially coaxial. Conduits 16 and 17 communicate with coil 15 at the bottom and top, respectively, of the latter. There is a discharge opening 18 adjacent the bottom of chamber E, and, in the top of the latter, an opening 19 communicating with a stack or conduit 20.

The feeding and dispersing means A and the combustion chamber C are provided with means for maintaining their walls at a controlled elevated temperature. According to the embodiment illustrated in the drawing, this is effected by surrounding the tube 3 and the cylinder 13 with jackets 21 and 22, respectively, defining about 3 and 13 annular spaces 23 and 24 which are substantially filled with a heat-exchange material, e. g., coarse sand. For circulating a heating fluid through spaces 23 and 24 I provide valved conduits 25 and 26 which communicate between conduit 17 and the jackets 21 and 22, respectively. The before-mentioned conduit 12 communicates between space 24 and burner B. Reference numeral 27 indicates a suitable exhaust outlet provided in jacket 21. Conduit 16 communicates with a source of relatively cool (e. g., room temperature) gas by means of conduit 28, from which latter branches valved conduit 29 communicating between conduit 28 and space 24.

I prefer to construct the wall 13 of the combustion chamber C of a heat-resisting ferrous alloy: for the other elements of the assembly there may be used any suitable metal such as iron, steel, or the like.

In operation, volcanic ash suitably graded (e. g., at about 150 mesh) is drawn from the hopper I by means of the feed worm 2 into and through tube 3 wherein it is advanced toward space 5 and simultaneously is heated to a temperature of about 800° C. The volcanic ash entering space 5 at this high temperature is contacted with city gas under pressure delivered from conduit 7, readily dispersing in said city gas, and by the gas is discharged from space 5 into conduit 9 of burner B in dispersed form: combustion air at a temperature of about 800° C. is led to the burner B through conduit 12, the air and dispersion of volcanic ash in fuel gas being mixed in the end of tube 10 and being thereafter discharged from orifice 11 of burner B into combustion chamber C. The wall 13 of this chamber is maintained at from 500° to 800° C., i. e., at a temperature above the ignition temperature of the city gas. The mixture of city gas and combustion air delivered into chamber C immediately undergoes combustion, yielding combustion products at a temperature of about 1200° C. in which the dispersed particles of volcanic ash individually become molten and assume a spherular form. The resulting suspension of spherular molten particles of volcanic ash in hot gaseous combustion products thence passes downwardly through chamber C and, by means of opening 14', into that space of chamber E defined by coil 15. Relatively cool (e. g., room temperature) air is passed through coil 15, by means of conduits 16 and 28, exerting a cooling effect upon the downwardly passed suspension from chamber C to an extent such that the suspension is cooled to a temperature below the incipient fusing point of volcanic ash. The suspension descends through space D into the main space of chamber E, wherein the solid spherular particles of volcanic ash tend to settle out of suspension. The gaseous combustion products leave the chamber E through stack 20, and may either be discharged directly to the atmosphere or may first be passed through any suitable separating means for removing suspended finely divided solids from gases (e. g., an electrostatic precipitator) before being discharged.

At the commencement of operations I prefer to heat the wall 13 of the combustion chamber C by circulating through space 24 air which has been heated in coil 15: however, when the said wall has attained a temperature of between 500° and 800° C., I prefer to circulate relatively cool air through said space, which object I may accomplish by cutting off heated air from valved conduit 26 and admitting room temperature air through valved conduit 29. I can, and under certain conditions may, pass into space 24 both room-temperature air and highly heated air, in any desired proportion, in order to accomplish the object of maintaining the wall 13 at a temperature between the ignition temperature of the fuel gas and the fusing temperature of the volcanic ash. Highly heated air from coil 15 likewise is used to heat the heat-exchange filling in space 23, and thence the finely divided volcanic ash in tube 3, the heating fluid being led to said space from conduit 17 by valved conduit 25.

An apparatus used in the development of this process had a cylindrical combustion chamber about 36" long and of about 12" diameter; below this chamber the cooling zone extended for another 36", with a diameter 16". This installation accommodated a flow of 1 cubic foot per minute, making possible the spherulization of about 150 pounds of volcanic ash per hour.

The process of the present invention is not restricted to the use of gaseous fuel. I have practiced it using a liquid fuel (e. g., ordinary fuel oil distillate) and, as well, finely pulverized coal instead of fuel gas. In carrying out the process using a liquid fuel I may disperse the preheated finely divided solid in the liquid fuel, supplementing with a small amount of air at a temperature below the ignition temperature of the fuel oil, and mix the resulting dispersion with preheated combustion air. When finely divided solid fuel (e. g., pulverized coal) is employed the latter may be mixed with the preheated finely divided solid material to be spherulized, the mixture is dispersed in a little air, and then the dispersion is combined with the rest of the necessary combustion air (in pre-heated condition) and the mixture burned.

Moreover, the successful carrying out of the principal concept of the present invention is not dependent upon dispersing the finely divided solid material (to be spherulized) in or with the fuel; I may, if desired, disperse the solid material in a part or all of the preheated combustion air and then combine that dispersion with the fuel just prior to ignition.

It is to be understood that the specific apparatus described and illustrated above is susceptible of considerable variation without marking a departure from the present invention. Thus chamber C may be made sufficiently tall to displace, or make unnecessary the use of, coil D. In such case, the lower portion (corresponding in position to coil D) would have an increased diameter in order to permit expansion of gases in that space and consequently to decrease the rate of flow of the gases. Also, cooling air may be admitted into space 24 at a plurality of points therealong, whereby to control the combustion wall temperature at intermediate points. Moreover, the flow of cooling gases through space 24 may be controlled by the interposition therein of suitable baffles whereby to distribute or guide the air in its passage therethrough.

This application contains subject matter in common with my application Serial No. 641,129, filed November 1, 1932.

I claim:

1. Process of spherulizing fusible pulverizable solid material which comprises preparing a dispersion of finely divided particles of the solid material, fuel and combustion air, whereby to distribute the particles in substantially uniform suspended relation to the fuel, introducing the resulting suspension into a space bounded by surfaces which are maintained at a temperature below the fusing temperature of said solid, igniting the fuel air mixture in said space whereby uniformly to heat the suspended particles at a temperature above the fusing temperature of said solid, passing the suspension of particles through a free space while cooling the suspension to below the fusing temperature of said solid, and collecting so-treated solid.

2. Process of spherulizing fusible pulverizable solid material which comprises preparing a dispersion of finely divided particles of the solid material, fuel and combustion air, whereby to distribute the particles in substantially uniform suspended relation to the fuel, introducing the resulting suspension into a space bounded by surfaces which are maintained at a temperature between the igniting temperature of said fuel and the fusing temperature of said solid, burning the fuel air mixture whereby uniformly to heat the suspended particles at a temperature above the fusing temperature of said solid, passing the suspension of particles through a free space while cooling the suspension to below the fusing temperature of said solid, and collecting so-treated solid.

3. Apparatus for use in spherulizing finely divided fusible solid material comprising a combustion chamber defined by metal walls, said combustion chamber having openings therein for introduction thereinto and for removal therefrom of aeriform fluids, means for dispersing finely divided fusible solid material with fuel and a combustion-supporting gas whereby to form an aeriform fluid, means for feeding said aeriform fluid into the combustion chamber, a jacket about at least a portion of said chamber walls defining a closed space, means for passing a cooling fluid through said closed space, and means in communication with the combustion chamber for cooling aeriform fluid discharged from said combustion chamber and for separating suspended solids from said aeriform fluid.

4. Apparatus comprising a combustion chamber defined by metal walls, said combustion chamber having openings therein for introduction thereinto and for removal therefrom of aeriform fluids, a jacket about at least a portion of said chamber walls defining a closed space, a packing of relatively small particles of refractory solid at least partially filling said space, and means for passing a cooling fluid through at least a portion of said packing.

5. Apparatus as defined in claim 4, in which there is provided means for passing said fluid from said space to and into one of said openings in said combustion chamber.

6. Apparatus as defined in claim 4, in which there is provided means for passing a plurality of streams of cooling fluid into said space at a plurality of points.

7. Apparatus as defined in claim 4, in which there are provided means for passing said fluid from said space to one of said openings in said combustion chamber and means at said opening for combining with said fluid an aeriform fluid and for introducing both fluids into said combustion chamber.

8. Apparatus for use in spherulizing finely divided fusible solid materials which comprises a combustion chamber defined by metal walls, said combustion chamber having openings therein for introduction thereinto and for removal therefrom of aeriform fluids, a jacket about at least a portion of said chamber walls defining a closed space, a packing of relatively small particles of refractory solid at least partially filling said space, means for passing a cooling combustion-supporting gas through at least a portion of said packing and for delivering said gas from said space to one of said openings in said combustion chamber, means for delivering to said opening an aeriform fluid comprising dispersed particles of finely divided fusible solid material to be spherulizing and a fuel, and means for combining said gas with said aeriform fluid and for delivering them into said combustion chamber.

9. Apparatus for use in spherulizing finely divided fusible solid material which comprises a combustion chamber, means for delivering to said combustion chamber a suspension of finely divided solid material in a combustible gas, a heat exchanger in communication with said combustion chamber, and means in communication with said heat exchanger for separating suspended solids from a suspension thereof in a gas.

10. Apparatus as defined in claim 9, in which the combustion chamber is substantially vertical and in which the heat exchanger and separating means constitute with the combustion chamber a substantially vertical passage for a stream of solid-in-gas suspension.

11. Apparatus as defined in claim 9, characterized in that there is provided means for passing a hot gas from said heat exchanger to said means for delivering a solid-in-gas suspension to said combustion chamber.

12. Apparatus for use in spherulizing finely divided fusible solid material which comprises a combustion chamber, means communicating with the upper end of said combustion chamber for delivering thereinto a suspension of finely divided solid material in a combustible gas, means communicating with the lower end of the combustion chamber for separating finely divided solids from said solid-in-gas suspension, a heat exchanger interposed in the path of said suspension flowing from said combustion chamber to said separating means, and means for delivering hot gas from said heat exchanger to the first-named suspension-delivering means.

13. Apparatus as defined in claim 12, in which the combustion chamber is provided with means for controlling the surface temperature thereof.

14. Apparatus for use in spherulizing finely divided fusible solid materials comprising an elongated substantially vertical combustion chamber, a mixing jet communicating with said chamber at the upper end of the latter, means for preheating finely divided solid material, means for dispersing the preheated finely divided solid material in a gas and for conducting such dispersion to said mixing jet, means for delivering a hot gas to said mixing jet, a subsidence chamber beneath said combustion chamber and communicating therewith, a heat-exchange means in said subsidence chamber beneath and adjacent the lower open end of the combustion chamber, said heat-exchange means being adapted to cool material passed into said subsidence chamber from said combustion chamber and simultaneously to heat a gas, an opening in said subsidence chamber remote from said heat exchange means and adapted for the removal of gas, and means for delivering hot gas from said heat exchange means to said preheating means.

15. Apparatus as defined in claim 14, in which there is provided about at least the major portion of the combustion chamber a heat exchanger adapted to control the wall temperature of said combustion chamber and simultaneously to heat a gas, which heat exchanger is in communication with said mixing jet.

CHESTER G. GILBERT.